United States Patent
Ooya (10) Patent No.: US 8,177,889 B2
(45) Date of Patent: May 15, 2012

(54) GAS REMOVAL DEVICE

(75) Inventor: Hajime Ooya, Osaka (JP)

(73) Assignee: Nitto Denko Corporation, Osaka (JP)

( * ) Notice: Subject to any disclaimer, the term of this patent is extended or adjusted under 35 U.S.C. 154(b) by 453 days.

(21) Appl. No.: 12/441,616

(22) PCT Filed: Sep. 19, 2007

(86) PCT No.: PCT/JP2007/068202
§ 371 (c)(1),
(2), (4) Date: Aug. 6, 2009

(87) PCT Pub. No.: WO2008/035714
PCT Pub. Date: Mar. 27, 2008

(65) Prior Publication Data
US 2009/0301306 A1     Dec. 10, 2009

(30) Foreign Application Priority Data

Sep. 22, 2006 (JP) .................................. 2006-257494
Sep. 22, 2006 (JP) .................................. 2006-257495

(51) Int. Cl.
*B01D 53/22* (2006.01)
*B01D 19/00* (2006.01)

(52) U.S. Cl. ............... 96/6; 96/4; 96/8; 96/10; 96/11; 95/46; 55/520

(58) Field of Classification Search ............... 96/4, 6, 96/8, 10, 11; 95/45, 46, 47, 54; 55/520
See application file for complete search history.

(56) References Cited

U.S. PATENT DOCUMENTS

| | | | | |
|---|---|---|---|---|
| 5,183,486 A * | 2/1993 | Gatten et al. ................... | 96/6 |
| 5,202,023 A * | 4/1993 | Trimmer et al. ................ | 96/8 |
| 5,340,384 A * | 8/1994 | Sims .............................. | 96/6 |
| 5,645,625 A * | 7/1997 | van Schravendijk et al. ... | 95/46 |
| 6,837,992 B2 * | 1/2005 | Gerner et al. .................. | 96/6 |
| 7,291,204 B2 * | 11/2007 | Suzuki et al. .................. | 96/8 |
| 7,708,811 B2 * | 5/2010 | Ooya .............................. | 96/6 |

FOREIGN PATENT DOCUMENTS

| | | |
|---|---|---|
| EP | 0 639 383 | 2/1995 |
| EP | 1 078 671 | 2/2001 |
| JP | 64-021712 U | 2/1989 |
| JP | 64-21712 U * | 2/1989 |
| JP | 10-165708 A | 6/1998 |
| JP | 11-333206 | 12/1999 |
| JP | 2004-322016 * | 11/2004 |
| JP | 2004-322016 A | 11/2004 |
| WO | 93/12866 | 7/1993 |

* cited by examiner

*Primary Examiner* — Jason M Greene (74) *Attorney, Agent, or Firm* — Hamre, Schumann, Mueller & Larson, P.C.

(57) ABSTRACT

A gas removal device 1 includes a decompression chamber 2 with an inlet 11 and an outlet 12 through which a liquid to be degassed flows therein and thereout, and a degassing element 5 that is accommodated in the decompression chamber 2 while having one end connected to the inlet 11 and another end connected to the outlet 12, and that allows the liquid to be degassed entering into the inlet 11 to pass through the degassing element 5. The degassing element 5 includes a tube bundle 15 composed of a plurality of flexible gas-permeable tubes 151, and a tying member 16 tying the plurality of gas-permeable tubes 151 to form the tube bundle 15. The tube bundle 15 is bent in a shape of coil with multiple turns in such a manner that a portion tied by the tying member 16 is included in a bent portion BP.

11 Claims, 9 Drawing Sheets

GAS REMOVAL DEVICE

TECHNICAL FIELD

The present invention relates to a gas removal device for removing gases from a liquid.

BACKGROUND ART

A dissolved gas in a liquid may cause corrosion of tubes through which a liquid flows, decrease in heat exchanger effectiveness and pressure due to bubble generation, and uneven application of a liquid due to generated bubbles. Hence, depending on the method and purpose of using a liquid, degassing is required.

Figure 9:
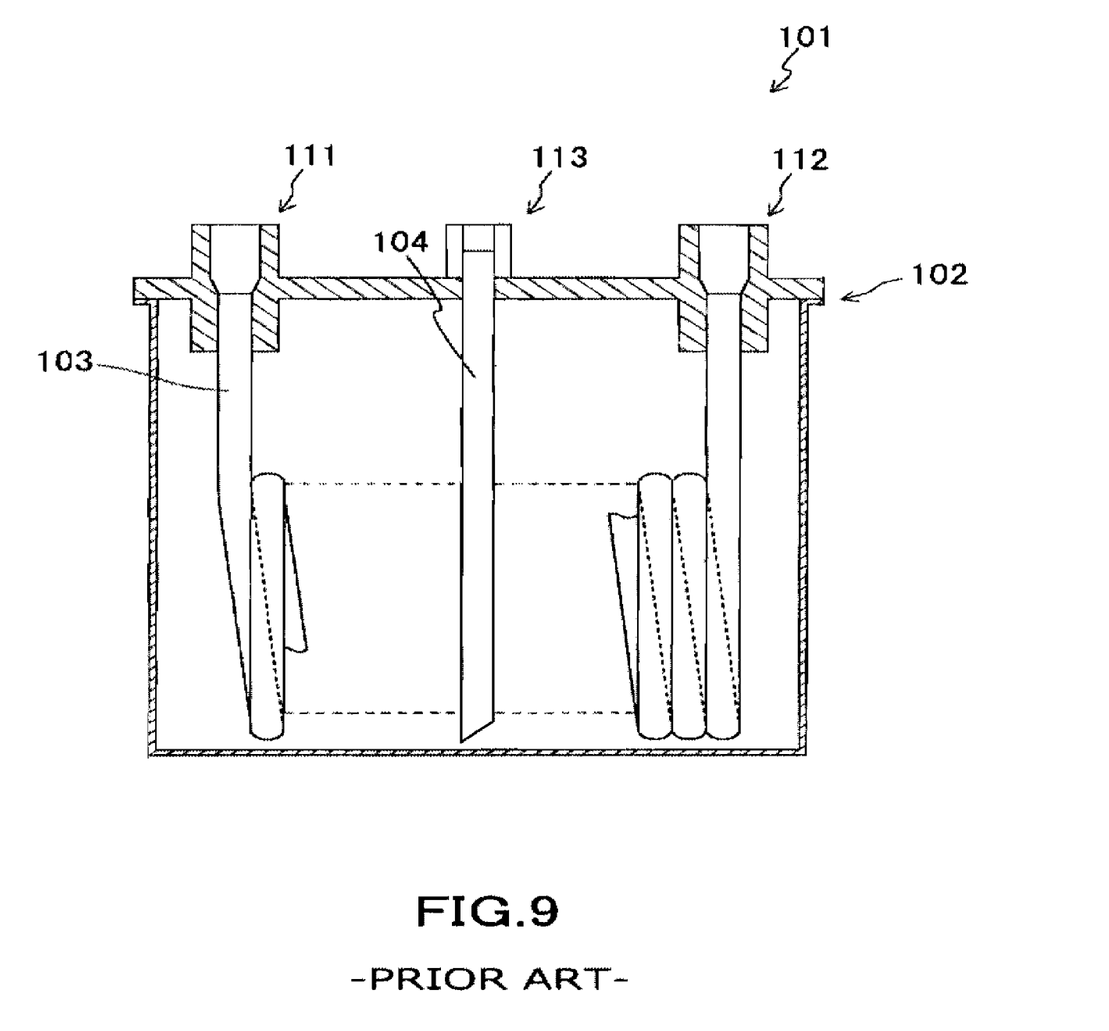
FIG. 9 is a cross-sectional view showing schematically an example of a conventional gas removal device.

For example, a gas removal device disclosed in JP 11-333206 A can be used for degassing a liquid (see FIG. 9). In a gas removal device 101 shown in FIG. 9, a gas-permeable tube 103 is accommodated in a decompression chamber 102 with an inlet 111 and an outlet 112 through which the liquid to be degassed flows in and out. One end of the gas-permeable tube 103 is connected to the inlet 111 and another end is connected to the outlet 112. A vacuum suction pipe 104 reaching a bottom portion in the decompression chamber 102 is attached to the decompression chamber 102. The vacuum suction pipe 104 is connected to a vacuum suction port 113 of the decompression chamber 102. In the gas removal device 101 thus configured, the liquid to be degassed is allowed to enter from the inlet 111 and flow through the gas-permeable tube 103, and an interior of the decompression chamber 102 is decompressed by a decompression device connected to the vacuum suction port 113. Thus the liquid can be degassed.

In the gas removal device as described above, thin gas-permeable tubes are used in many cases so that they can contact with the liquid in a larger area and enhance the degassing performance. The thin gas-permeable tubes buckle sometimes when they are bent to be accommodated in the decompression chamber. In the gas-permeable tubes thus buckled, the flow resistance of the liquid to be degassed increases, and the gas removal device cannot exert its degassing performance sufficiently.

DISCLOSURE OF INVENTION

In view of the foregoing, the present invention is intended to provide a gas removal device in which the buckling of the gas-permeable tubes is prevented, and that exerts high degassing performance.

The present invention provides a gas removal device including a decompression chamber with an inlet and an outlet through which a liquid to be degassed flows in and out, and a degassing element that is accommodated in the decompression chamber while having one end connected to the inlet and another end connected to the outlet, and that allows the liquid to be degassed entering into the inlet to pass through the degassing element. The degassing element includes a tube bundle composed of a plurality of flexible gas-permeable tubes, and a tying member that ties the plurality of gas-permeable tubes to form the tube bundle. The degassing element is accommodated in the decompression chamber in such a manner that at least a part of the tube bundle makes a bent portion formed by bending the tube bundle. The tying member is disposed on at least a part of the bent portion.

In the gas removal device of the present invention, the plurality of gas-permeable tubes is tied by the tying member to make the tube bundle. The tube bundle is bent in such a manner that a portion tied by the tying member is included in the bent portion. When the tube bundle is bent, bending stress is generated in the gas-permeable tubes. The gas-permeable tubes tend to change their form into one that can alleviate the stress, but such a change cannot be made easily because a tying force of the tying member is acting on them. As a result, the occurrence of buckling is prevented. The liquid to be degassed circulates smoothly in the gas-permeable tubes that are not buckled, and thereby a gas removal device exerting high degassing performance can be realized.

In another aspect, the present invention provides a gas removal device including a decompression chamber with an inlet and an outlet through which a liquid to be degassed flows in and out, and a degassing element that is accommodated in the decompression chamber while having one end connected to the inlet and another end connected to the outlet, and that allows the liquid to be degassed entering into the inlet to pass through the degassing element. The degassing element includes a tube bundle composed of a plurality of gas-permeable tubes, and a tying member winding spirally around the tube bundle to tie the plurality of gas-permeable tubes. At least a part of the tube bundle wound by the tying member is bent. The same effect can be obtained by such a configuration.

BEST MODE FOR CARRYING OUT THE INVENTION

Hereinbelow, embodiments of the present invention will be described with reference to the accompanying drawings.

Embodiment 1

Figure 1:
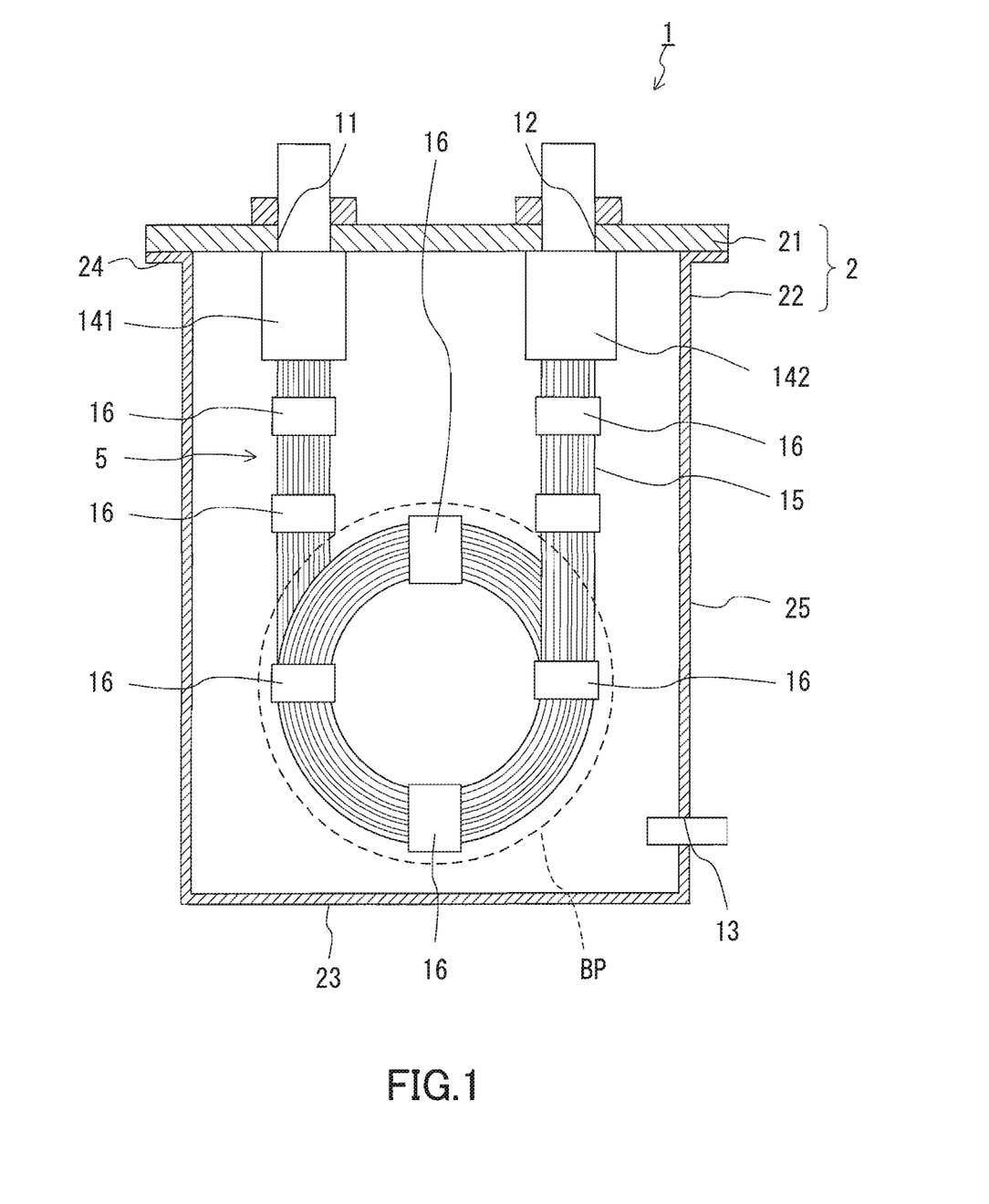
FIG. 1 is a half cross-sectional view of a gas removal device of Embodiment 1 of the present invention.

FIG. 1 shows a gas removal device of Embodiment 1 of the present invention. The gas removal device 1 includes a decompression chamber 2. The decompression chamber 2 includes an inlet 11 and an outlet 12 through which a liquid to be degassed circulates, and a vacuum suction port 13 to be connected to a decompression device. The decompression chamber 2 has a cover 21, and a chamber main body 22 with a tubular shape. The chamber main body 22 has a bottom portion 23 and an opening portion 24. The inlet 11 and the outlet 12 are provided at the cover 21. The vacuum suction port 13 is provided at a side part 25 of the chamber main body 22. The cover 21 is fixed to the opening portion 24 of the chamber main body 22 in such a manner that airtightness in the decompression chamber 2 is maintained. A degassing element 5 is disposed in the decompression chamber 2. The degassing element 5 has an end connected to the inlet 11 and another end connected to the outlet 12.

Figure 2:
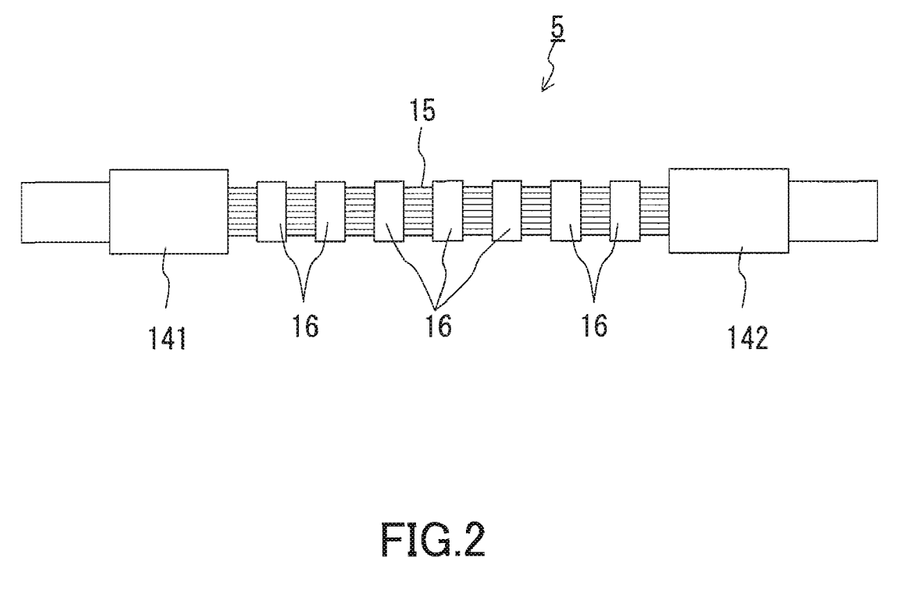
FIG. 2 is a plan view of a degassing element shown in FIG. 1.
Figure 3:
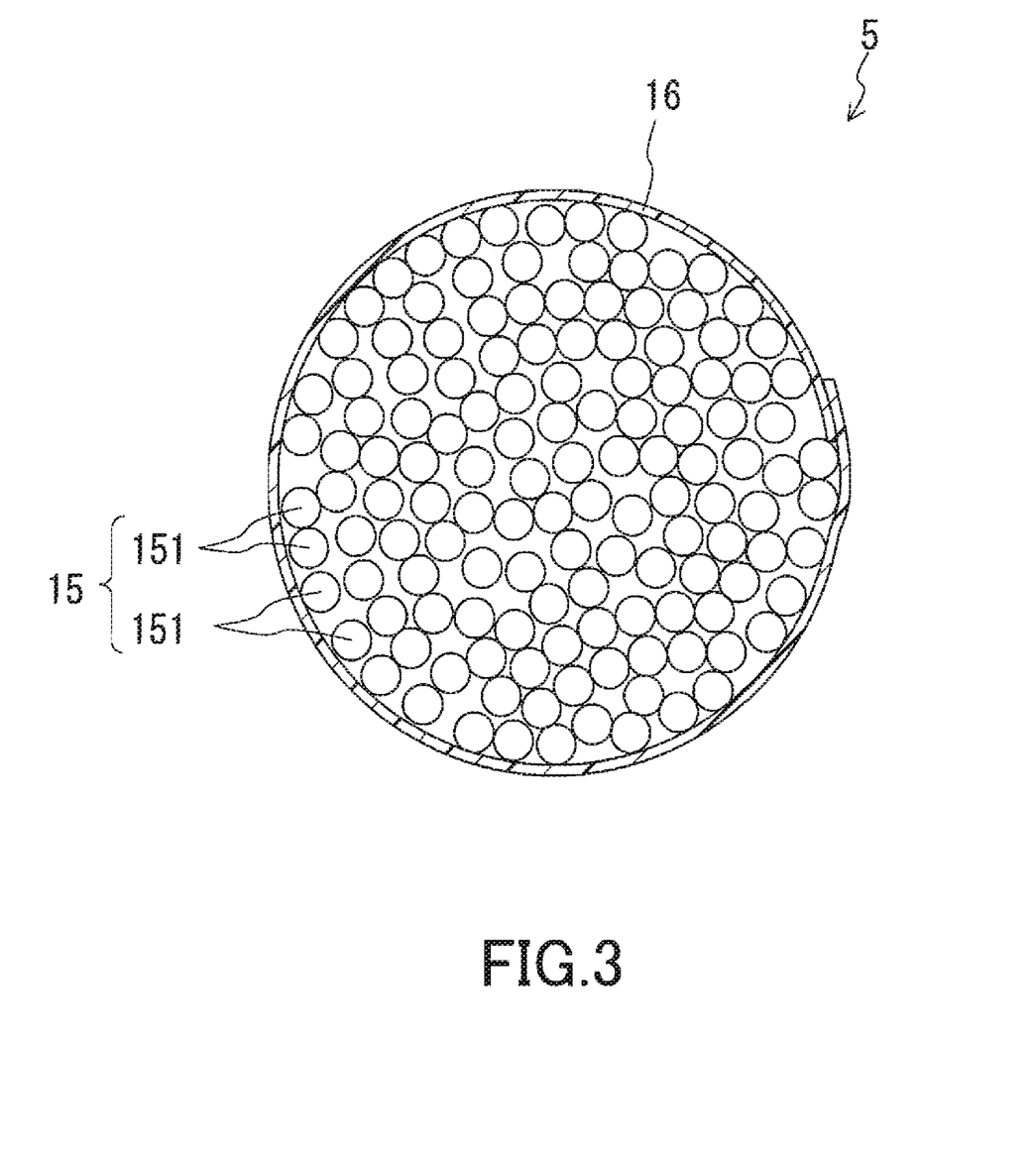
FIG. 3 is an enlarged cross-sectional view of an essential portion of the degassing element.

As shown in FIG. 2 and FIG. 3, the degassing element 5 has a tube bundle 15 composed of a plurality of flexible gas-permeable tubes 151, tubular adapters 141 and 142, and tying members 16 tying the gas-permeable tubes 151. The adapters 141 and 142 include the inlet side adapter 141 attached to one end of the tube bundle 15 and connected to the inlet 11 of the decompression chamber 2, and the outlet side adapter 142 attached to another end of the tube bundle 15 and connected to the outlet 12 of the decompression chamber 2. The liquid to be degassed that has flowed into the inlet 11 via the inlet side adapter 141 circulates through the degassing element 5, that is, circulates through the gas-permeable tubes 151, and then flows out from the outlet 12 via the outlet side adapter 142.

As shown in FIG. 1, the degassing element 5 is accommodated in the decompression chamber 2 while the tube bundle 15 is bent in a shape of coil with multiple turns. In other words, between the inlet side adapter 141 and the outlet side adapter 142, a bent portion BP is formed by bending a part of the tube bundle 15 in a circular shape, and the tying members 16 each are disposed at plural points in the circular bent portion BP. When thus configured, a sufficient length of the tube bundle 15 (length of the gas-permeable tube 151) can be ensured while the decompression chamber 2 of a small size is employed. Thus, the degassing capability of the gas removal device 1 can be enhanced relatively easily.

The tying members 16 winding around the tube bundle 15 play a role of tying the gas-permeable tubes 151 into one bundle and maintaining the form of the tube bundle 15, as well as a role of preventing each of the gas-permeable tubes 151 from buckling when the tube bundle 15 is bent. When the tube bundle 15 is bent in a shape of coil with multiple turns to form the bent portion BP as shown in FIG. 1, bending stress is generated in the gas-permeable tubes 151. At this time, the form of the gas-permeable tubes 151 tends to change into one that can alleviate the stress. However, since the tube bundle 15 is bent in such a manner that portions tied by the tying members 16 are included in the bent portion BP, the form of the gas-permeable tubes 151 is not changed easily. As a result, the occurrence of buckling is prevented. Disposing the tying members 16 on the bent portion BP at a predetermined interval allows the tying force to act evenly on the gas-permeable tubes 151 in a longitudinal direction. Thus, an enhanced effect of preventing buckling can be expected.

The gas-permeable tubes 151 and 151 adjacent to each other are not bonded mutually between the inlet side adapter 141 and the outlet side adapter 142. More specifically, the gas-permeable tubes 151 and 151 are bonded (welded, to be specific) to each other only at both ends connected to the adapters 141 and 142. Since the tying force that the tying members 16 exert on the gas-permeable tubes 151 is not so large, the gas-permeable tubes 151 can move back and forth in the longitudinal direction. The tying members 16 do not cover the gas-permeable tubes 151 entirely, and they are disposed along the longitudinal direction at a constant interval. That is, when the tube bundle 15 is bent, some of the gas-permeable tubes 151 located on an inner circumferential side move back and forth slightly in the longitudinal direction, and deform in such a manner that a portion of the gas-permeable tubes 151 not tied by the tying members 16 is somewhat raised toward a center of the circle. As a result, the bending stress can be relaxed, enhancing the effect of preventing buckling.

Also, tying the gas-permeable tubes 151 into one bundle improves the workability at the time of placing the degassing element 5 in the decompression chamber 2. Use of the tying members 16 easily prevents the gas-permeable tubes 151 from being loose. This makes it unnecessary to bond the gas-permeable tubes 151 and 151 together by using an adhesive or by performing thermal welding. Since a gap can be created between the gas-permeable tubes 151 and 151, the degassing performance of the degassing element 5 is expected to be enhanced.

As the tying member 16, a string, a tube, a chain, and a film can be used, for example. Particularly, a thin film is preferable. When the tying member 16 is a film, it winds around the tube bundle 15, and thereby it can tie the plurality of gas-permeable tubes 151 in such a manner that it wraps them. Then, the tying force exerted by the tying member 16 acts on the gas-permeable tubes 151 in plane, and thereby an excellent effect of preventing buckling can be obtained.

The film used as the tying member 16 preferably has gas permeability. Using the gas-permeable film as the tying member 16 makes it possible to tie the gas-permeable tubes 151 almost without deteriorating the gas permeability of the gas-permeable tubes 151. Specific examples of the gas-permeable film include a porous film, and a laminated film obtained by stacking a reinforcement material on the porous film. When the laminated film obtained by stacking a reinforcement material on a porous film is employed as the tying member 16, the reinforcing material preferably has gas permeability greater than that of the porous film. Specifically, a woven fabric, a nonwoven fabric, a mesh, a net, a sponge, a foam, a foamed material, and a porous material, these made of resin or metal, can be used as the reinforcement material.

Examples of the porous film suitable for the tying member 16 include a porous film made of fluororesin, such as polytetrafluoroethylene (PTFE), tetrafluoroethylene-perfluoroalkyl vinyl ether copolymer, ethylene-tetrafluoroethylene copolymer, and polychlorotrifluoroethylene, as well as a porous film made of polyolefin, such as polyethylene and polypropylene. Among them, the porous film made of polytetrafluoroethylene is preferable because it has excellent gas permeability and chemical resistance.

The tying member 16 may be of a strip-like shape. As shown in the cross-sectional view of FIG. 3, both ends of the tying member 16 tying the gas-permeable tubes 151 are fixed to each other by an adhesive or thermal welding. Or the tying member 16 partially may be fixed to the tube bundle 15 using an adhesive etc. to prevent positional deviation of the tying member 16. In the present embodiment, the gas-permeable tubes 151 are tied by the tying members 16 at a plurality of points along the longitudinal direction. When thus configured, the gas-permeable tubes 151 can be tied more reliably. Moreover, appropriately adjusting the interval at which the tying members 16 are disposed can prevent the gas permeability of the gas-permeable tubes 151 from being deteriorated.

Other components will be described. Both of the cover 21 and the chamber main body 22 of the decompression chamber 2 are obtained by molding metal, glass, or plastic into a specific shape. As the metal, stainless steel is preferable because of its excellent chemical resistance. As the plastic, fluororesin and polyolefin can be used. Considering durability and the necessity for forming the vacuum suction port 13, the decompression chamber 2 desirably is made of metal.

A tube commonly used in gas removal devices may be used as the gas-permeable tubes 151. Specifically, there can be used a tube made of fluororesin, such as polytetrafluoroethylene (PTFE), tetrafluoroethylene-perfluoroalkyl vinyl ether copolymer, ethylene-tetrafluoroethylene copolymer, and polychlorotrifluoroethylene, or a tube made of polyolefin, such as polyethylene and polypropylene. In order to increase a membrane area per unit volume, thin hollow fibers preferably are used as the gas-permeable tubes 151 as shown in FIG. 3. In this case, an inner diameter of one hollow fiber (the gas-permeable tube 151) is in a range of about several tens of micrometers to several millimeters, and about several to several hundreds of hollow fibers generally constitute the single tube bundle 15.

Figure 4:
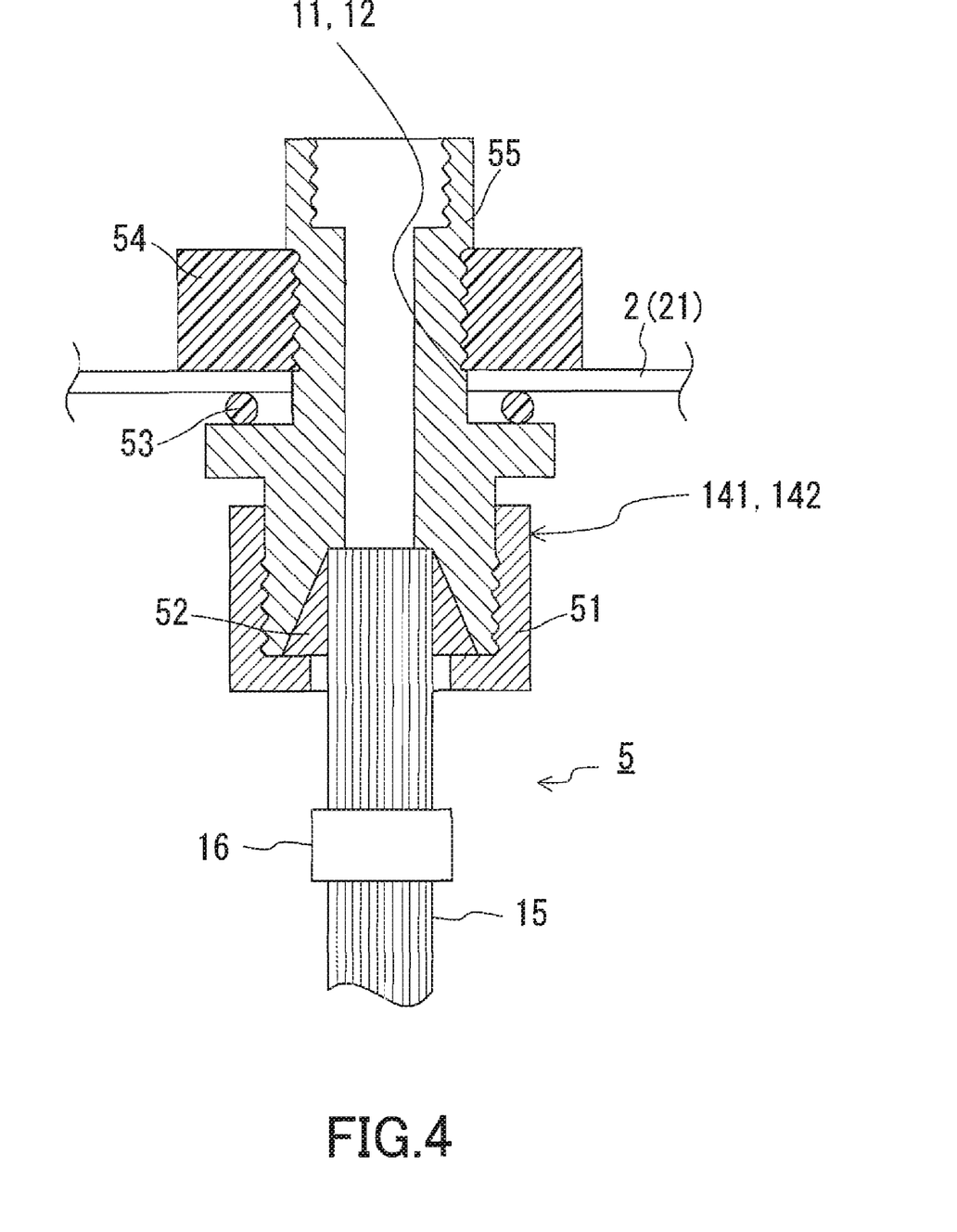
FIG. 4 is a cross-sectional view showing an example of a connection method for the gas-permeable tubes in the gas removal device of the present invention.

In the present embodiment, the tube bundle 15 is connected to the outlet 11 and the inlet 12 via the adapters 141 and 142. An adapter with a structure as shown in FIG. 4 can be employed as the adapters 141 and 142. As shown in FIG. 4, the adapters 141 and 142 each include a wedge 52, a cap nut 51, and a mouth piece fitting 55 so as to be fixed to the end of the tube bundle 15. The mouth piece fitting 55 to which the tube bundle 15 is fixed is fixed to the inlet 11 or the outlet 12 provided at the cover 21 by using an O ring 53 and a nut 54. The mouth piece fitting 55 may be welded to the tube bundle 15 by using a thermally weldable fluororesin powder. Moreover, in the present embodiment, the inlet 11 and the outlet 12 are provided at the cover 21, but the inlet 11 and/or the outlet 12 can be provided at the side part 25 or the bottom portion 23 of the chamber main body 22 as well.

Figure 5:
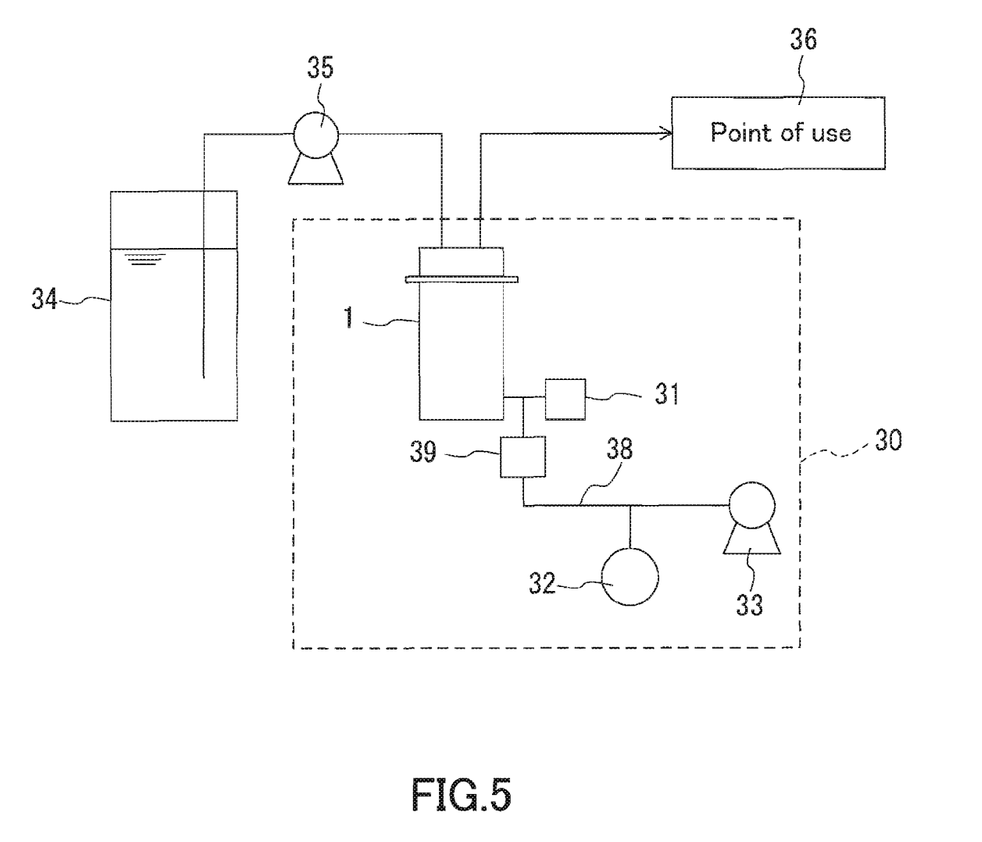
FIG. 5 is a configuration diagram of a degassing system using the gas removal device of the present invention.

Next, FIG. 5 shows a configuration diagram of a degassing system using the gas removal device of FIG. 1. A degassing system 30 is disposed between a tank 34 holding the fluid that has not yet degassed and a point of use 36 of the fluid that has been degassed. The degassing system 30 includes: the gas removal device 1; a vacuum pump 33 (a decompression device) for decompressing inside of the decompression chamber 2 of the gas removal device 1 to a pressure lower than an atmospheric pressure; a vacuum suction pipe 38 that connects the vacuum pump 33 to the gas removal device 1 to form a vacuum line; a vacuum gauge 32 for measuring a pressure in the vacuum suction pipe 38; and a liquid leakage sensor 31 located at a position closer to the gas removal device 1 than a position of the vacuum gauge 32 in the vacuum line. The gas removal device 1 is installed in such a manner that the bottom portion 23 of the chamber main body 22 is oriented vertically downward, and the cover 21 with the inlet 11 and the outlet 12 is oriented vertically upward. A pump 35 pumps up the fluid held in the tank 34 and sends it to the degassing system 30, and then sends the degassed fluid to the point of use 36.

In the degassing system 30 shown in FIG. 5, the vacuum gauge 32 disposed on the vacuum line between the gas removal device 1 and the vacuum pump 33 is checked for fluctuation. Thereby, the occurrence of liquid leakage can be judged. However, when the liquid leakage is small in amount, it is difficult to make the judgment promptly only from the fluctuation of the vacuum gauge 32. Therefore, it is preferable that the occurrence of the liquid leakage is judged based on a result of the detection by the liquid leakage sensor 31 so as to determine whether the degassing process should be stopped or continued. The type of the liquid leakage sensor 31 is not particularly limited. For example, a liquid leakage sensor having two conducting wires to detect a change in resistance between the conducting wires, or a liquid leakage sensor of optical fiber type can be used. Moreover, a detector, such as a liquid leakage sensor and a vacuum gauge, may be disposed in the decompression chamber 2 of the gas removal device 1.

As shown in FIG. 5, in the degassing system 30, a liquid trap 39 may be disposed on the vacuum line between the gas removal device 1 and the vacuum pump 33. The liquid trap 39 plays a role of preventing the liquid to be degassed that has flowed into the vacuum suction pipe 38 via the vacuum suction port 13 from being drawn into the vacuum pump 33 and contacting the vacuum gauge 32. When thus configured, the vacuum gauge 32 and the vacuum pump 33 can be protected from failure.

As the liquid trap 39, it is possible to use a small chamber capable of holding a liquid, and a component including a gas permeable filter that allows a gas to permeate therethrough while preventing a liquid from permeating therethrough. A specific example of such a gas permeable filter is a porous filter including a porous membrane made of fluororesin or polyolefin resin. Specifically, the liquid trap 39 is disposed between the liquid leakage sensor 31 and the vacuum pump 33 on the vacuum line, preferably between the liquid leakage sensor 31 and the vacuum gauge 32.

Embodiment 2

Figure 6:
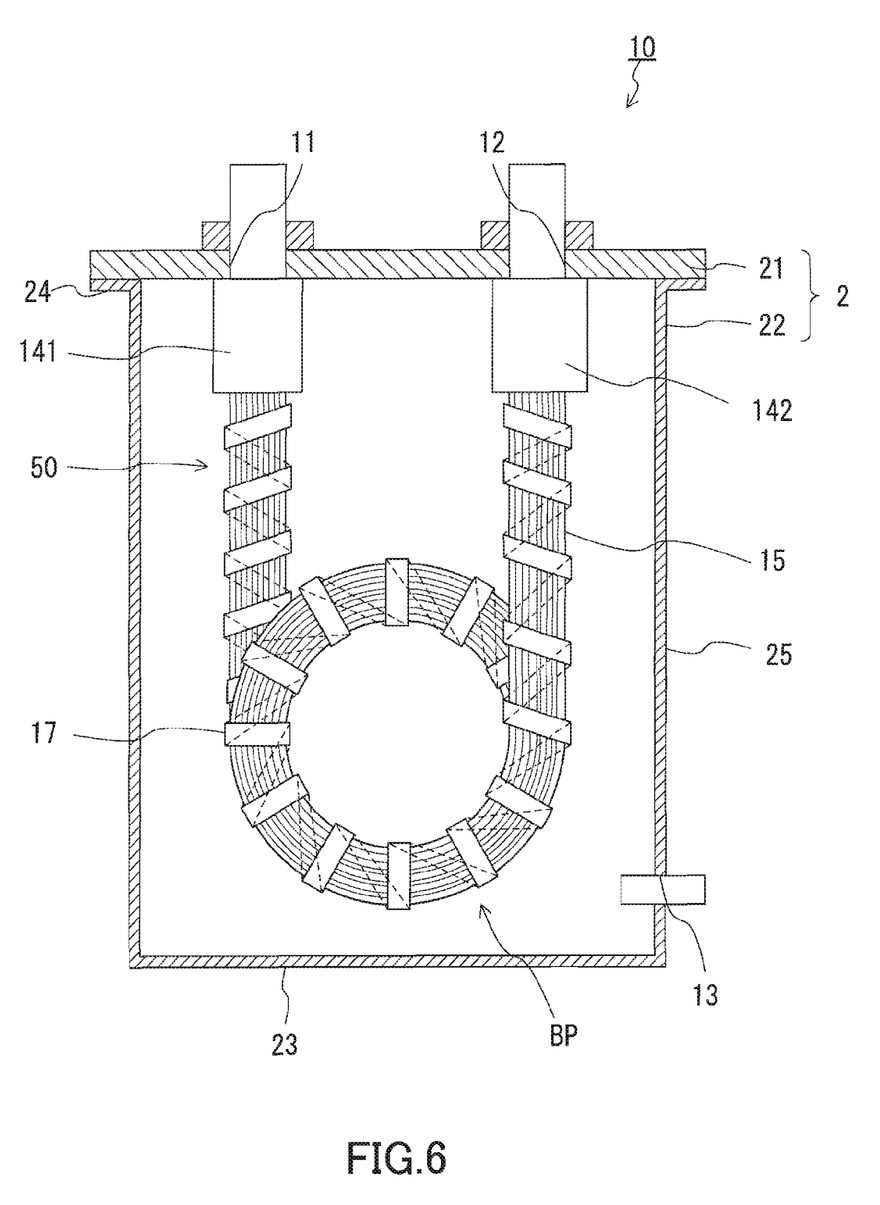
FIG. 6 is a half cross-sectional view of a gas removal device of Embodiment 2 of the present invention.

FIG. 6 shows a gas removal device of Embodiment 2 of the present invention. A difference between the gas removal device of Embodiment 1 described previously and the gas removal device of Embodiment 2 is the way of tying the gas-permeable tubes constituting the degassing element. Other configurations are common between the embodiments, as understood from the fact that they use the same reference numerals.

Figure 7:
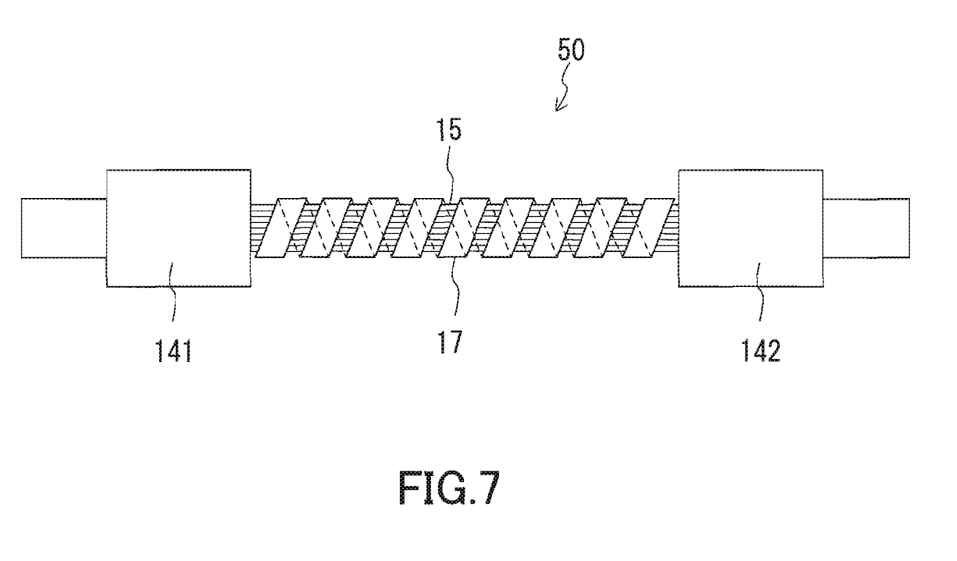
FIG. 7 is a plan view of a degassing element shown in FIG. 6.

As shown in FIG. 6, the gas removal device 10 of the present embodiment includes the decompression chamber 2, and a degassing element 50 disposed in the decompression chamber 2. The configuration of the decompression chamber 2 is as described in Embodiment 1. As shown in FIG. 7, the degassing element 50 is composed of the tube bundle 15 including the plurality of gas-permeable tubes 151, a tying member 17 tying the gas-permeable tubes 151, and the adapters 141 and 142.

The degassing element 50 is accommodated in the decompression chamber 2 while the tube bundle 15 is bent in a shape of coil with multiple turns. In other words, the bent portion BP is formed by bending in a circular shape a part of the tube bundle 15 wound by the tying member 17 between the inlet side adapter 141 and the outlet side adapter 142. When thus configured, a sufficient length of the tube bundle 15 (length of the gas-permeable tube 151) can be ensured while the decompression chamber 2 of a small size is employed. Thus, the degassing capability of the gas removal device 10 can be enhanced relatively easily.

The tying member 17 winding spirally around the tube bundle 15 plays a role of tying the gas-permeable tubes 151 into one bundle, as well as a role of preventing each of the gas-permeable tubes 151 from buckling when the tube bundle 15 is bent. When the tube bundle 15 is bent in a shape of coil with multiple turns and the bent portion BP is formed as shown in FIG. 6, bending stress is generated in the gas-permeable tubes 151. At this time, the form of the gas-permeable tubes 151 tends to be changed into one that can alleviate the stress. However, since the tube bundle 15 is bent in such a manner that a portion tied by the tying member 17 is included in the bent portion BP, the form of the gas-permeable tubes 151 does not change easily. As a result, occurrence of the buckling is prevented.

The gas-permeable tubes 151 and 151 adjacent to each other are not bonded mutually between the inlet side adapter 141 and the outlet side adapter 142. More specifically, the gas-permeable tubes 151 and 151 are bonded (welded, to be specific) to each other only at both ends connected to the adapters 141 and 142. The tying force that the tying member 17 exerts on the gas-permeable tubes 151 is not so large. Accordingly, when the tube bundle 15 is bent, some of the gas-permeable tubes 151 located on the inner circumferential side move back and forth slightly in the longitudinal direction, relaxing the bending stress. Such a stress relaxation effect obtained by warpage of the gas-permeable tubes 151 is as described in Embodiment 1. However, the present embodiment is more effective than Embodiment 1 in preventing the gas-permeable tubes 151 from buckling. The reason is as follows.

Figure 8:
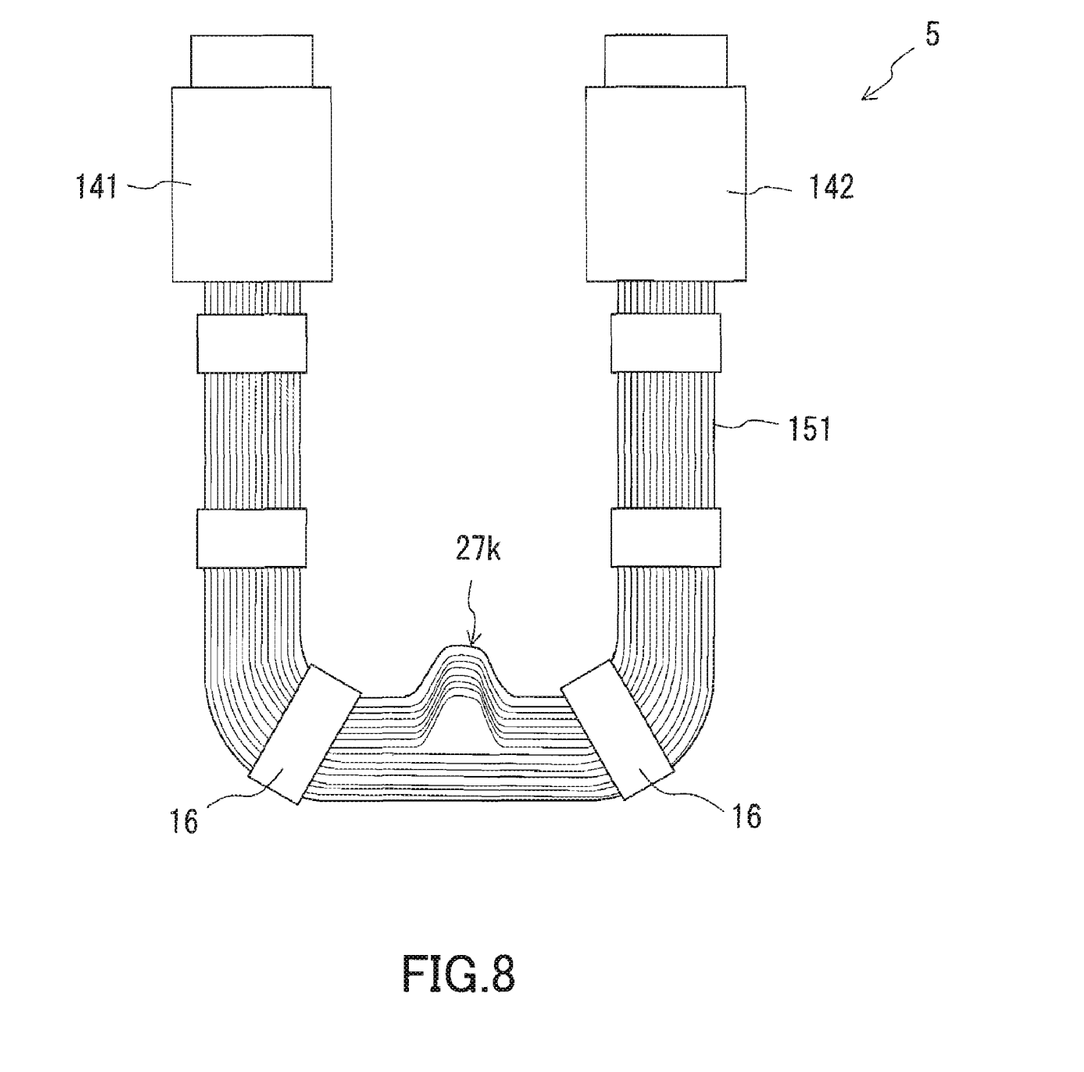
FIG. 8 is a schematic view showing a deformation of the gas-permeable tubes when the tube bundle is bent.

As shown in FIG. 8, when the degassing element 5 described in Embodiment 1 is bent, some of the gas-permeable tubes 151 located on the inner circumferential side are warped between two of the tying members 16 adjacent to each other, and a warped portion 27k is formed in some cases. The warped portion 27k is not a serious problem as long as it does not hinder the circulation of the liquid. However, it possibly could result in buckling of the gas-permeable tubes 151. Thus, the warped portion 27k should not be formed. In order to prevent the formation of the warped portion 27k, a tying force acts evenly on the entire gas-permeable tubes 151 in the longitudinal direction. Disposing the tying members 16 at a short interval makes it easy for the tying force to act evenly on the entire gas-permeable tubes 151 in the longitudinal direction. It should be noted, however, that when the interval at which the tying members 16 are disposed is too short, the gas permeability of the gas-permeable tubes 151 possibly may be deteriorated.

In contrast, the long tying member 17 winds spirally around the tube bundle 15 in the present embodiment. Thus, the tying force that the tying member 17 exerts on the gas-permeable tubes 151 is more even in the longitudinal direction of the gas-permeable tubes 151 than that in Embodiment 1. Accordingly, the warped portion 27k as shown in FIG. 8 hardly is formed, and a greater effect of preventing buckling can be obtained.

Preferable materials for the tying member 17 are as described in Embodiment 1.

It is preferable that the tying member 17 is of a strip-like shape, and that both ends thereof are fixed to the tube bundle 15 or the adapters 141 and 142 by an adhesive or thermal welding. Moreover, adjusting the spiraling interval of the tying member 17 appropriately makes it possible to prevent the tying member 17 from deteriorating the gas permeability of the gas-permeable tubes 151. The single strip-like tying member 17 winds spirally around the tube bundle 15 in the present embodiment. It is also possible that the same single tying member 17 is prepared additionally, and the two tying members 17 and 17 wind around the tube bundle 15 to form a double spiral. Such a configuration allows the gas-permeable tubes 151 to be tied more reliably, and allows the tying force to act more evenly. As a result, an excellent effect of preventing buckling can be obtained.

The invention claimed is:

1. A gas removal device comprising:
a decompression chamber with an inlet and an outlet through which a liquid to be degassed flows therein and thereout; and
a degassing element that is accommodated in the decompression chamber while having one end connected to the inlet and another end connected to the outlet, and that allows the liquid to be degassed entering into the inlet to passes through the degassing element, wherein:
the degassing element includes a tube bundle composed of a plurality of flexible gas-permeable tubes, and a plurality of tying members tying the plurality of gas-permeable tubes at a plurality of points along a longitudinal direction of the tubes to form the tube bundle;
the degassing element is accommodated in the decompression chamber in such a manner that at least a part of the tube bundle makes a bent portion formed by bending the tube bundle;
the tying members are disposed on at least a part of the bent portion;
each of the plurality of tying members is gas permeable and comprises a porous film; and
the plurality of tying members wind around the tube bundle to tie the plurality of gas-permeable tubes into one bundle in such a manner that the gas-permeable tubes can move back and forth in the longitudinal direction of the gas-permeable tubes.

2. The gas removal device according to claim 1, wherein the porous film is made of polytetrafluoroethylene.

3. The gas removal device according to claim 1, wherein:
the degassing element further includes an inlet side adapter attached to one end of the tube bundle and connected to the inlet, and an outlet side adapter attached to another end of the tube bundle and connected to the outlet;
the bent portion is formed by bending the tube bundle in a circular shape between the inlet side adapter and the outlet side adapter; and
the tying members are disposed on the circular bent portion at a predetermined interval.

4. A gas removal device comprising:
a decompression chamber with an inlet and an outlet through which a liquid to be degassed flows therein and thereout; and
a degassing element that is accommodated in the decompression chamber while having one end connected to the inlet and another end connected to the outlet, and that allows the liquid to be degassed entering into the inlet to pass through the degassing element, wherein:
the degassing element includes a tube bundle composed of a plurality of gas-permeable tubes, and a tying member winding spirally around the tube bundle to tie the gas-permeable tubes;
at least a part of the tube bundle wound by the tying member is bent;
the tying member is gas permeable and comprises a porous film, and
the tying member winds around the tube bundle to tie the plurality of gas-permeable tubes into one bundle in such a manner that the gas-permeable tubes can move back and forth in the longitudinal direction of the gas-permeable tubes.

5. The gas removal device according to claim 4, wherein the porous film is made of polytetrafluoroethylene.

6. The gas removal device according to claim 4, wherein:
the degassing element further includes an inlet side adapter attached to one end of the tube bundle and connected to the inlet, and an outlet side adapter attached to another end of the tube bundle and connected to the outlet; and
a bent portion is formed by bending in a circular shape the part of the tube bundle wound by the tying member between the inlet side adapter and the outlet side adapter.

7. The gas removal device according to claim 1, wherein:
each of the tying members is composed of a laminated film obtained by stacking a reinforcement material on the porous film; and
the reinforcement material has gas permeability greater than that of the porous film.

8. The gas removal device according to claim 4, wherein:
the tying member is composed of a laminated film obtained by stacking a reinforcement material on the porous film; and the reinforcement material has gas permeability greater than that of the porous film.

9. The gas removal device according to claim 3, wherein the gas-permeable tubes are bonded to each other only at both ends connected to the adapters.

10. The gas removal device according to claim 6, wherein the gas-permeable tubes are bonded to each other only at both ends connected to the adapters.

11. The gas removal device according to claim 4, wherein:
the tying member is of a strip shape; and
a spiraling interval of the tying member is adjusted so that a part of the tube bundle is directly exposed to an atmosphere in the decompression chamber.

* * * * *